United States Patent [19]

Nakamura et al.

[11] Patent Number: 6,049,642
[45] Date of Patent: Apr. 11, 2000

[54] NONLINEAR OPTICAL SWITCH

[75] Inventors: Shigeru Nakamura; Kazuhito Tajima, both of Tokyo, Japan

[73] Assignee: NEC Corporation, Tokyo, Japan

[21] Appl. No.: 08/947,937

[22] Filed: Oct. 9, 1997

[30] Foreign Application Priority Data

| Oct. 9, 1996 | [JP] | Japan | ................................ | 8-268195 |
| Aug. 6, 1997 | [JP] | Japan | ................................ | 9-211534 |

[51] Int. Cl.[7] .................................................. G02B 6/35
[52] U.S. Cl. ............................. 385/16; 385/24; 385/122; 359/332
[58] Field of Search ............................. 385/16, 24, 122, 385/5; 359/326, 332

[56] References Cited

U.S. PATENT DOCUMENTS

| 5,369,519 | 11/1994 | Islam | ........................................ | 359/173 |
| 5,596,667 | 1/1997 | Watanabe | ................................ | 385/122 |
| 5,742,415 | 4/1998 | Manning et al. | ........................ | 359/128 |

FOREIGN PATENT DOCUMENTS

| 1-252928 | 10/1989 | Japan . |
| 4-19718 | 1/1992 | Japan . |
| 4-159512 | 6/1992 | Japan . |
| 5-188411 | 7/1993 | Japan . |
| 6-265945 | 9/1994 | Japan . |
| 7-20510 | 1/1995 | Japan . |

OTHER PUBLICATIONS

Applied Physics Letters, vol. 70, No. 26 pp. 3498–3500 (Published Jun. 30, 1997) S. Nakamura and K. Tajima.

T. Morioka et al., "All–Optical Kerr Switching Techniques and Applications", *Institute of Electrical and Electronics Engineers*, vol. 2, No. 2, Dec. 1990, pp. 1311–1317.

D.M. Patrick et al., "Demultiplexing Using Crossphase Modulation–Induced Spectral Shifts and Kerr Polarisation Rotation in Optical Fibre", *Electronics Letters*, vol. 29, No. 2, Jan. 21, 1993, pp. 227–229.

S. Nakamura et al., "Ultrafast all–optical gate switch based on frequency shift accompanied by semiconductor band–filling effect", *Appl. Phys. Lett.,* vol. 70, No. 26, Jun. 30, 1997, pp. 3498–3500.

"Ultafast Optical Techniques", edited by Tatsuo Yajima, Chapter 5, p. 121, 1990.

"A.M. Weiner et al., High–resolution femtosecond pulse shaping", Journal of Optical Society of America, B, vol. 5, No. 8, Aug. 1998, pp. 1563–1572.

*Primary Examiner*—John D. Lee
*Assistant Examiner*—Juliana K. Kang
*Attorney, Agent, or Firm*—Sughrue, Mion, Zinn, Macpeak & Seas, PLLC

[57] ABSTRACT

An optically controlled optical switch operating at a high speed and at a high efficiency can be realized with a simple construction. An optical signal exiting from a nonlinear optical waveguide is passed through an optical frequency filter and then guided into an optical output signal port. The optical frequency filter is a band-pass filter for passing only optical signal pulses having a center frequency of $\omega 1$. Where the center frequency $\omega 0$ of controlling light is set within the absorption region of the nonlinear optical waveguide, optical controlling pulses are absorbed, and carriers are excited. This results in a change in the refractive index. Consequently, the center frequency $\omega 1$ of only the optical signal pulses entered simultaneously with the optical controlling pulses is shifted to $\omega 2$. The optical frequency filter blocks optical signal pulses whose center frequency has been shifted to $\omega 2$. Thus, a gate-type optical switching action is accomplished.

19 Claims, 14 Drawing Sheets

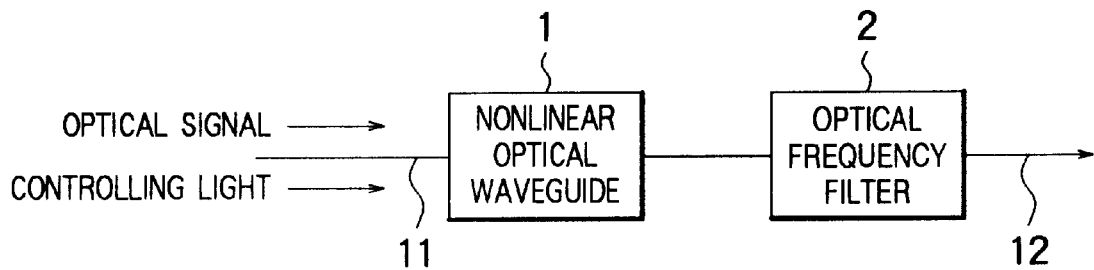
FIG. 2
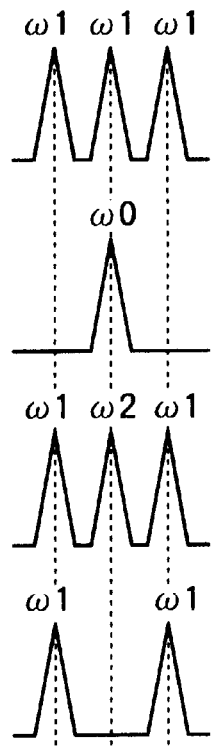
FIG. 3A  OPTICAL SIGNAL TO 11
FIG. 3B  CONTROLLING LIGHT TO 11
FIG. 3C  OPTICAL SIGNAL FROM 1
FIG. 3D  OPTICAL SIGNAL FROM 12

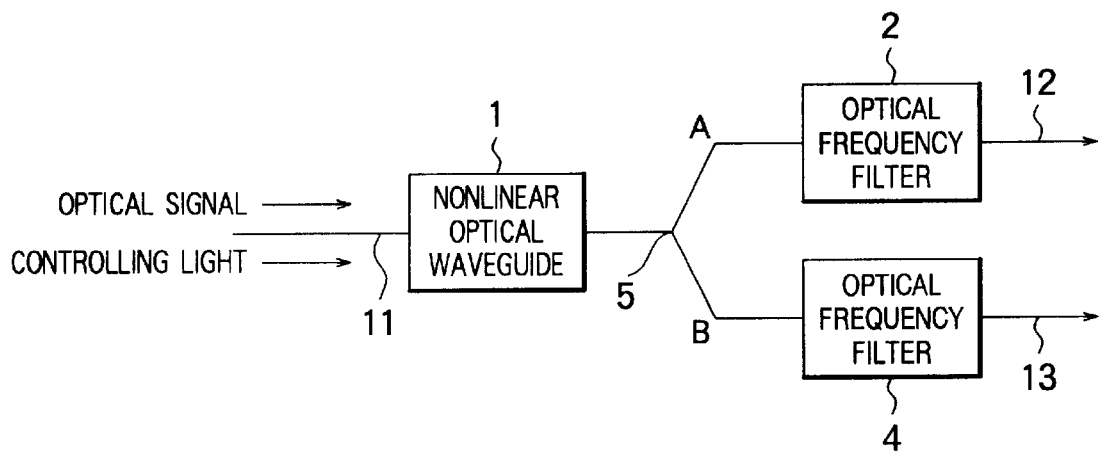
FIG. 4
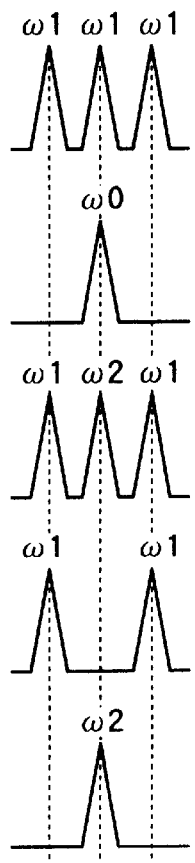
FIG. 5A  OPTICAL SIGNAL TO 11
FIG. 5B  CONTROLLING LIGHT TO 11
FIG. 5C  OPTICAL SIGNAL FROM 1
FIG. 5D  OPTICAL SIGNAL FROM 12
FIG. 5E  OPTICAL SIGNAL FROM 13

FIG. 7A  OPTICAL SIGNAL TO 11

FIG. 7B  CONTROLLING LIGHT TO 11

FIG. 7C  OPTICAL SIGNAL FROM 1

FIG. 7D  OPTICAL SIGNAL FROM 3

FIG. 7E  OPTICAL SIGNAL FROM 12

FIG. 7F  OPTICAL SIGNAL FROM 13

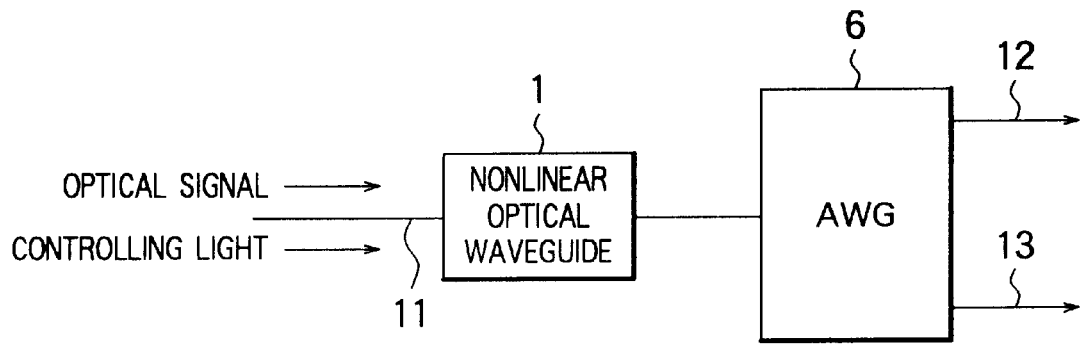
FIG. 8
| | | |
|---|---|---|
| FIG. 9A | OPTICAL SIGNAL TO 1 | 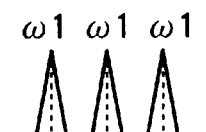 |
| FIG. 9B | CONTROLLING LIGHT TO 1 |  |
| FIG. 9C | OPTICAL SIGNAL FROM 1 | 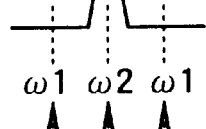 |
| FIG. 9D | OPTICAL SIGNAL FROM 11 | 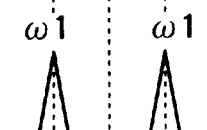 |
| FIG. 9E | OPTICAL SIGNAL FROM 12 | 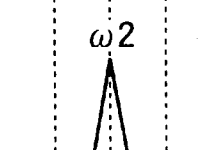 |

FIG. 11A   OPTICAL SIGNAL TO 11

FIG. 11B   CONTROLLING LIGHT TO 11

FIG. 11C   OPTICAL SIGNAL FROM 1

FIG. 11D   OPTICAL SIGNAL FROM 12

FIG. 11E   OPTICAL SIGNAL FROM 13

FIG. 11F   OPTICAL SIGNAL FROM 14

FIG. 13A  OPTICAL SIGNAL TO 11 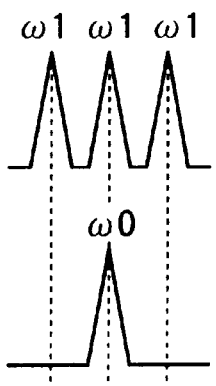
FIG. 13B  1ST CONTROL. LIGHT TO 11 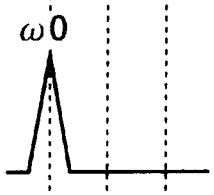
FIG. 13C  2ND CONTROL. LIGHT TO 11 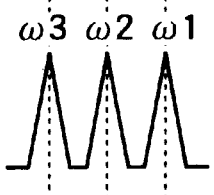
FIG. 13D  OPTICAL SIGNAL FROM 1 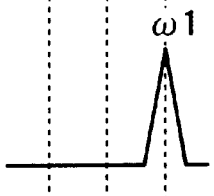
FIG. 13E  OPTICAL SIGNAL FROM 12 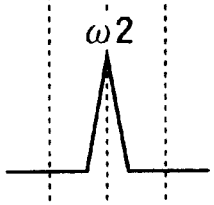
FIG. 13F  OPTICAL SIGNAL FROM 13 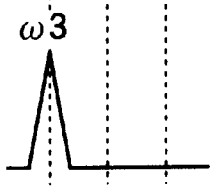
FIG. 13G  OPTICAL SIGNAL FROM 14

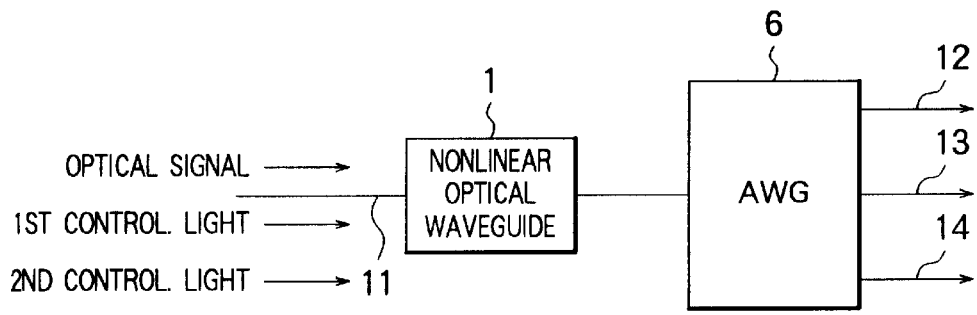
FIG. 14
FIG. 15A    OPTICAL SIGNAL TO 11 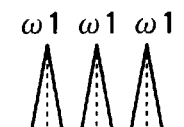
FIG. 15B    1ST CONTROL. LIGHT TO 11 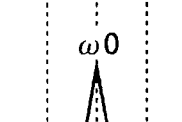
FIG. 15C    2ND CONTROL. LIGHT TO 11 
FIG. 15D    OPTICAL SIGNAL FROM 1 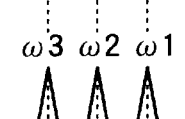
FIG. 15E    OPTICAL SIGNAL FROM 12 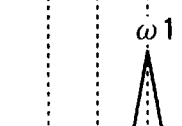
FIG. 15F    OPTICAL SIGNAL FROM 13 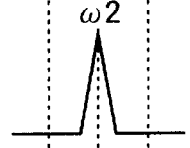
FIG. 15G    OPTICAL SIGNAL FROM 14 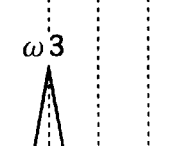

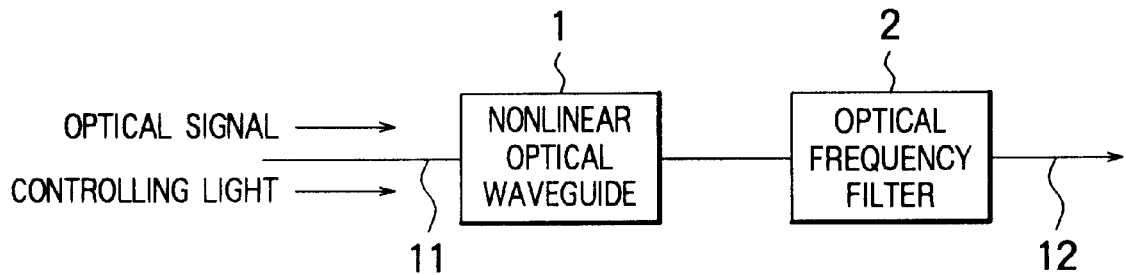
FIG. 16
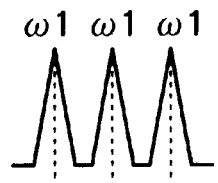
FIG. 17A  OPTICAL SIGNAL TO 11
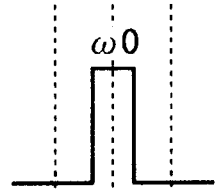
FIG. 17B  CONTROLLING LIGHT TO 11
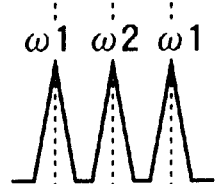
FIG. 17C  OPTICAL SIGNAL FROM 1
FIG. 17D  OPTICAL SIGNAL FROM 12

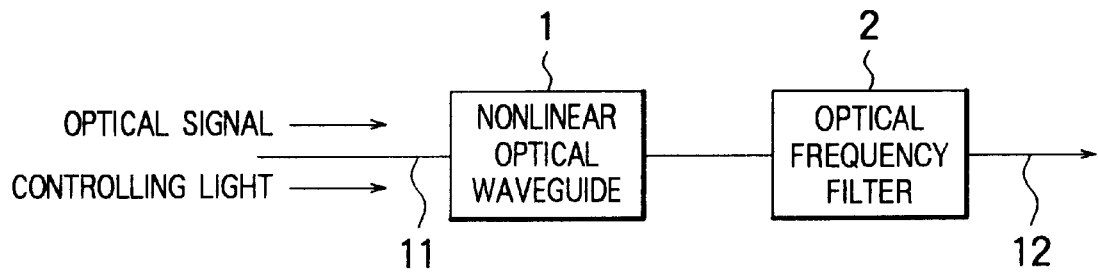
FIG. 18
FIG. 19A  OPTICAL SIGNAL TO 11 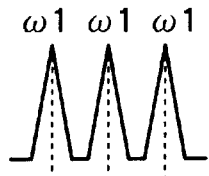
FIG. 19B  CONTROLLING LIGHT TO 11 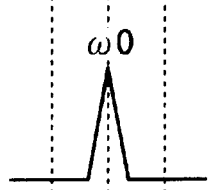
FIG. 19C  OPTICAL SIGNAL FROM 1 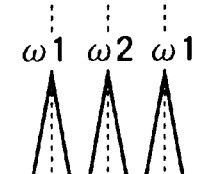
FIG. 19D  OPTICAL SIGNAL FROM 12 WHERE LPF IS USED. 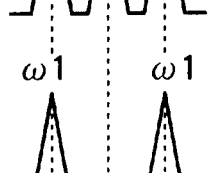
FIG. 19E  OPTICAL SIGNAL FROM 12 WHERE HPF IS USED. 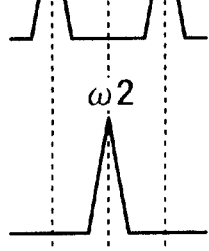

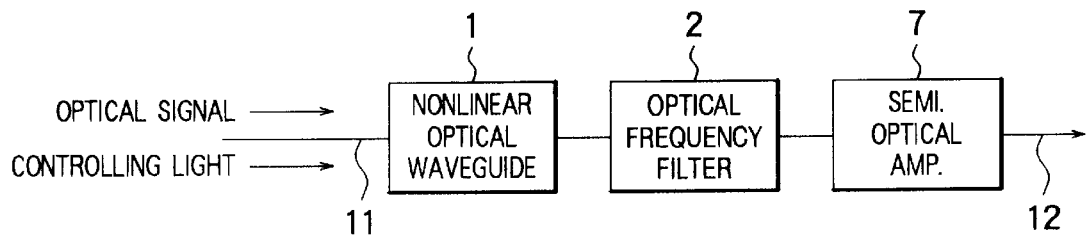
FIG. 21
FIG. 22A  OPTICAL SIGNAL TO 11
FIG. 22B  CONTROLLING LIGHT TO 11
FIG. 22C  OPTICAL SIGNAL FROM 1
FIG. 22D  OPTICAL SIGNAL FROM 12
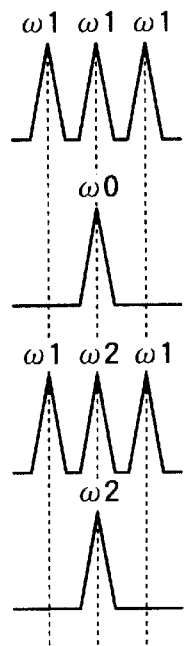

NONLINEAR OPTICAL SWITCH

BACKGROUND OF THE INVENTION

The present invention relates to an optical switch and, more particularly, to an optical switch used in optical fiber communications, optical information processing, and other applications.

It is considered that constructing an all-optical system (i.e., using neither optoelectrical conversion nor electro-optical conversion in transmission paths, in multiplexing/demultiplexing circuits, or in logic circuits) is necessary to increase the speeds of optical transmission systems and of optical information-processing systems. To enable this, optical switches capable of operating at high speeds are required. Conventionally, a method of switching light by an electrical signal (electrooptical control) has been adopted in optical switches. In recent years, however, a method of switching light by means of light (all-optical control) has attracted attention as a method expected to provide higher speeds. Especially, in an optical transmission system, if an ultrafast all-optical switch can be employed in an optical demultiplexer, then a great breakthrough will be made in realizing a large-capacity time-division multiplexing system.

The performance required in making all-optical switches practical is not limited to the aforementioned high speeds. Rather, various other kinds of performance such as low switching energy, high-repetition operations, and compactness are needed. Especially, with respect to switching energy, this energy must be within the range of optical pulse energies achieved by a semiconductor laser, fiber amplifier, or semiconductor laser amplifier.

A first problem produced in realizing these kinds of performance is that the figure of merits of nonlinear optical effects on which all-optical switches are based, given by $\chi^{(3)}/\tau\alpha$, are generally almost constant. In this formula, the $\chi^{(3)}$ is the magnitude of a nonlinearity, $\tau$ is the response time, and the $\alpha$ is a signal loss. That is, it is considered that a nonlinear optical effect satisfying a large nonlinearity and a high speed simultaneously is difficult to obtain. Nonlinear optical effects can be roughly classified into the nonresonantly excited type and the resonantly excited type. The nonresonantly excited type is expected to provide high speeds but it produces small nonlinearities. That is, it is considered that nonlinear optical effects relying on non-resonant excitation with a practical level of switching energy are difficult. In contrast, in the resonantly excited type, carriers excited in a nonlinear optical medium relax slowly and present problems in realizing high-speed operation. However, the nonlinearity is large, which is a large advantage in practical applications. Accordingly, various methods for solving slow relaxations and achieving high-speed operation have been proposed. A conventional all-optical switch utilizing a highly efficient, resonantly excited nonlinear optical effect is next given as an example.

Japanese Patent Unexamined Publication No. 20510/1995 discloses an all-optical switch having a nonlinear optical waveguide using a semiconductor medium whose nonlinear refractive index is varied by absorption of controlling light. The construction of this optical switch is shown in FIG. 1, where a Mach-Zehnder interferometer is constructed, using 3-dB couplers 23, 24 comprising fibers. An optical signal is entered through an optical signal input port 27 and divided into parts by the 3-dB coupler 23 and interfered by the 3-dB coupler 24. The phase difference between two interfering light waves determines which of optical signal output ports 30 and 31 delivers an optical output signal. Controlling light pulses are entered into controlling light input ports 28 and 29 with a given time difference T, pass through wavelength-selecting couplers 25 and 26, respectively, and then enter nonlinear optical waveguides 21 and 22, respectively. First, a controlling light pulse enters the nonlinear optical waveguide 21, varying its refractive index. An optical signal passing through this waveguide undergoes a nonlinear phase shift. It is assumed that an optical signal is delivered from the optical signal output port 30 under the initial condition. The nonlinear phase shift in the nonlinear optical waveguide 21 causes the optical signal to exit from the optical signal output port 31. The refractive index change in the nonlinear optical waveguide 21 is produced by excitation of carriers by resonant controlling light. Therefore, the refractive index change rises very quickly while following the controlling light pulse, but the relaxation time is long. Consequently, under this condition, it takes a long time to return to the initial state. However, after a lapse of the time T, a controlling light pulse is entered into the nonlinear optical waveguide 22, thus inducing a change in the nonlinear refractive index. An optical signal passed through this waveguide undergoes a nonlinear phase shift. This cancels out the effect of the refractive index change remaining in the nonlinear optical waveguide 21. Therefore, the enabled port is switched back to the optical signal output port 30. In this way, ultrahigh speed switching of optical signals is possible.

The problem with the above-described prior art technique lies in the fact that the optical circuitry is made complex and bulky. At branching portions and bending portions of waveguides, optical signal losses take place. Concomitantly, the branch angle is suppressed or the radius of curvature is increased, which in turn makes the optical circuitry larger.

SUMMARY OF THE INVENTION

It is an object of the present invention to provide an optical switch consisting of a simple optical circuit and operating at a high speed and high efficiency.

This object is achieved in accordance with the teachings of the invention by an optical switch, comprising means for entering an optical signal and a controlling light, an optical waveguide consisting of a nonlinear optical medium having a nonlinear refractive index that is varied by absorption or amplification of the controlling light, and an optical frequency filter for transmitting only certain optical frequencies of the optical signal exiting from the optical waveguide.

The above object is also achieved by an optical switch, comprising means for entering an optical signal and a controlling light, an optical waveguide consisting of a nonlinear optical medium having a nonlinear refractive index that is varied by absorption or amplification of the controlling light, an optical branching circuit for dividing an optical signal exiting from the optical waveguide into plural parts, and an optical frequency filter for each of the plural parts, each filter transmitting only certain optical frequencies of the optical signal exiting from the optical waveguide.

The above object is also achieved by an optical switch, comprising means for entering an optical signal and a controlling light, an optical branching circuit for dividing each of the optical signal and the controlling light into plural parts, each optical waveguide consisting of a nonlinear optical medium having a nonlinear refractive index that is varied by absorption or amplification of the controlling light, the waveguide receiving the optical signal and controlling light exiting from the optical branching circuit, and each optical frequency filter for transmitting only certain optical frequencies of the optical signal exiting from the optical waveguide.

The above-object is also achieved by an optical switch, comprising means for entering an optical signal and a controlling light, an optical waveguide consisting of a nonlinear optical medium having a nonlinear refractive index that is varied by absorption or amplification of the controlling light, and means for diffracting the optical signal exiting from the optical waveguide to different output ports according to the different optical frequencies of the optical signal.

Other objects and features of the invention will appear in the course of the description thereof, which follows.

BRIEF DESCRIPTION OF THE DRAWINGS

FIG. 2 is a diagram of an optical switch forming a first embodiment of the present invention;

FIGS. 3A–3D are waveform diagrams, illustrating the operation of the optical switch shown in FIG. 2;

FIG. 4 is a diagram of an optical switch forming a second embodiment of the invention;

FIGS. 5A–5E are waveform diagrams, illustrating the operation of the optical switch shown in FIG. 4;

FIGS. 7A–7F are waveform diagrams, illustrating the operation of the optical switch shown in FIG. 6;

FIG. 8 is a diagram of an optical switch forming a fourth embodiment of the invention;

FIGS. 9A–9E are waveform diagrams, illustrating the operation of the optical switch shown in FIG. 8;

FIGS. 11A–11F are waveform diagrams, illustrating the operation of the optical switch shown in FIG. 10;

FIGS. 13A–13G are waveform diagrams, illustrating the operation of the optical switch shown in FIG. 12;

FIG. 14 is a diagram of an optical switch forming a seventh embodiment of the invention;

FIGS. 15A–15G are waveform diagrams, illustrating the operation of the optical switch shown in FIG. 14;

FIG. 16 is a diagram of an optical switch forming an eighth embodiment of the invention;

FIGS. 17A–17D are waveform diagrams, illustrating the operation of the optical switch shown in FIG. 16;

FIG. 18 is a diagram of an optical switch forming a ninth embodiment of the invention;

FIGS. 19A–19E are waveform diagrams, illustrating the operation of the optical switch shown in FIG. 18;

FIG. 21 is a diagram of an optical switch forming a tenth embodiment of the invention;

FIGS. 22A–22D are waveform diagrams, illustrating the operation of the optical switch shown in FIG. 21;

DESCRIPTION OF THE PREFERRED EMBODIMENTS

Figure 1:
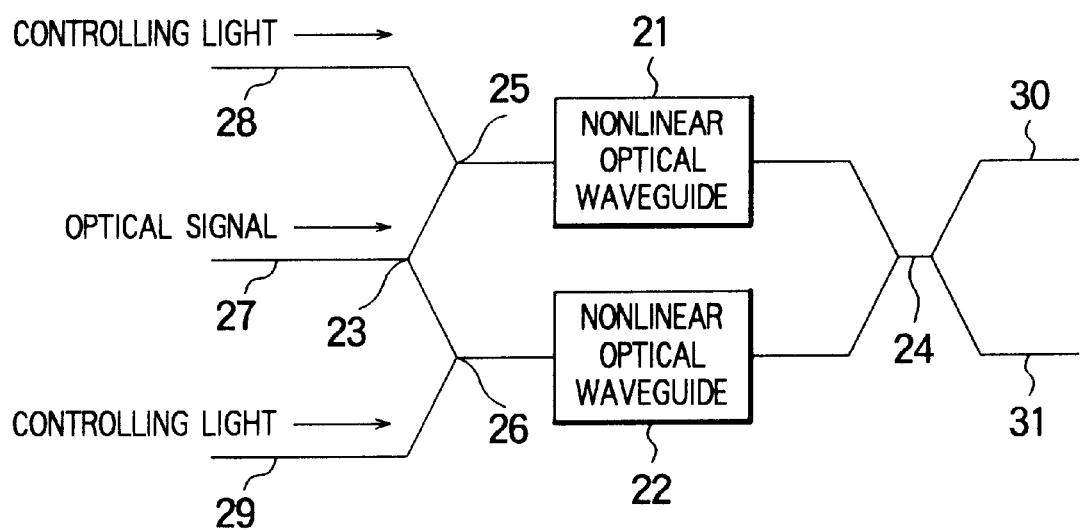
FIG. 1 is a diagram of the prior art optical switch.

First through tenth embodiments of the present invention are hereinafter described by referring to the accompanying drawings.

FIG. 2 shows the construction of a gate-type optical switch, constituting a first embodiment of the invention. An optical signal pulse having a center frequency of $\omega 1$ and a controlling light having a center frequency of $\omega 1$, respectively, are entered through an optical signal/controlling light input port 11 and pass into a nonlinear optical waveguide 1. This waveguide 1 has an optical waveguide portion consisting of a nonlinear optical medium whose nonlinear refractive index changes when the controlling light is absorbed or amplified. The center frequency $\omega 1$ is set within the transparent region of the nonlinear optical waveguide 1. The optical signal going out of the nonlinear optical waveguide 1 passes through an optical frequency filter 2, and is then guided to an optical signal output port 12. The optical frequency filter 2 is a band-pass filter for transmitting only the optical signal pulses having the center frequency of $\omega 1$.

Where the center frequency $\omega 0$ of the controlling light is set within the absorption region of the nonlinear optical waveguide 1, the controlling light pulses are absorbed and carriers are excited. This causes a change in the refractive index. The optical waveguide portion of this nonlinear optical waveguide 1 may be made of a semiconductor gain medium that amplifies the controlling light and varies the refractive index. Where the controlling light is amplified, the controlling light is augmented and the carriers are reduced, inducing a variation in the refractive index. In both cases of absorption and amplification, a carrier density change accompanies a refractive index variation. This refractive index variation rises at an ultrahigh speed while following the controlling optical pulse, but falls slowly as a result of carrier recombination. When the refractive index variation rises at an ultrahigh speed, the phase of the optical signal changes with time, and the frequency shifts. Since the relaxation time constant of the refractive index variation is long, a frequency shift that the optical signal pulse experiences is negligible. Actually, where a controlling light having a pulse width of 2 ps is used, the rising period is on the order of 2 ps. However, the falling period is normally on the order of ns. Therefore, the amount of frequency shift is smaller than that obtained during the rising period by two or three orders of magnitude.

FIGS. 3A–3D are waveform diagrams illustrating the operation of the first embodiment shown in FIG. 2. As described in the preceding paragraph, a refractive index change produced in the nonlinear optical waveguide 1 shifts only the center frequency of the optical signal (from $\omega 1$ to $\omega 2$) entered simultaneously with the controlling optical pulse. This shifted optical signal pulse is blocked by the optical frequency filter 2, thus accomplishing gate-type optical switching action. In consequence, an all-optical switch operated at a high speed and at a high efficiency can be realized with a simple structure.

The optical switch in accordance with the present invention makes use of changes in the nonlinear refractive index. These changes are induced by variations in the carrier density of the nonlinear optical medium. The switching action itself ceases during the rising period of the refractive index change. However, it normally takes a time on the order of nanosecond for carrier in the nonlinear waveguide to disappear. Notice that this does not always require that the repetition time of the switching be set longer than the carrier lifetime. The refractive index variation necessary for a single switching action is smaller than the range of the refractive index variation of the nonlinear optical medium. That is, even if carriers remain in the nonlinear optical medium, absorption of controlling light and thus a change in the refractive index can occur. Therefore, the action can be repeated at a frequency sufficiently higher than the reciprocal of the carrier lifetime.

An example of the first embodiment of the present invention is now described. A nonlinear optical waveguide 1 is a buried semiconductor optical waveguide comprising a core of InGaAsP and claddings of InP. This semiconductor optical waveguide is fabricated by growing InGaAsP on an InP substrate by metallo-organic chemical vapor deposition (MOCVD (also known as MOVPE)), patterning the InGaAsP layer into stripes by lithography and wet etching techniques, and growing a layer of InP again by MOCVD to bury InGaAsP. Antireflective coating is applied to both end surfaces of this optical waveguide. The optical waveguide portion made of InGaAsP has an absorption end wavelength of 1.500 $\mu$m, a thickness of 0.3 $\mu$m, a width of 1 $\mu$m, and a length of 300 $\mu$m. The optical frequency filter 2 is designed to have a transmission wavelength of 1.550 $\mu$m and a bandwidth of 3.0 nm.

The controlling light has a pulse width of 1.5 ps and a wavelength of 1.500 $\mu$m. This wavelength lies within the absorption region of the InGaAsP core. The dependence of the intensity I of the controlling optical pulse to time t is given by $$I(t) = \text{sech}^2(1.76\ t/\text{tp})$$

where tp is the half-width value of the pulse. The optical signal has a pulse width of 1 ps, a spectral width of 2.6 nm, and a wavelength of 1.5500 $\mu$m. This wavelength is set within the transparent region of the InGaAsP core. The center frequency of the optical signal pulse entered simultaneously with the controlling light pulse is shifted toward higher frequencies by 0.59 THz. That is, the wavelength is shifted toward shorter wavelengths by 4.7 nm. At this time, the amount of nonlinear phase shift introduced to the optical signal in the nonlinear optical waveguide 1 is $2\pi$. The optical pulse whose center frequency is shifted to 1.5453 $\mu$m is blocked by the optical frequency filter 2 and thus a gate-type optical switching action is obtained.

FIG. 4 shows the construction of an optical switch forming the second embodiment of the invention, the optical switch having 1 input and 2 outputs. An optical signal pulse having a center frequency of $\omega 1$ and a controlling light pulse having a center frequency of $\omega 0$ are entered through an optical signal/controlling light input port 11 and pass into the nonlinear optical waveguide 1. The optical waveguide portion of the nonlinear optical waveguide 1 is made of a nonlinear optical medium whose nonlinear refractive index is varied by absorption or amplification of the controlling light. The center frequency $\omega 1$ is within the transparent region of the optical waveguide portion of the nonlinear optical waveguide 1. Where the center frequency $\omega 1$ is set within the absorption region of the optical waveguide portion of the nonlinear optical waveguide 1, the controlling light pulse is absorbed, and carriers are excited. This results in a change in the refractive index. The optical waveguide portion of this nonlinear optical waveguide 1 may also be made of a semiconductor gain medium whose refractive index varies when the controlling light is amplified. The optical signal emerging from the nonlinear optical waveguide 1 is distributed between arms A and B by an optical branching circuit 5. The resulting light portions pass through optical frequency filters 2 and 4 and are guided into optical signal output ports 12 and 13, respectively. The optical frequency filter 2 transmits only the signal light pulse having the center frequency of $\omega 1$, while the optical frequency filter 4 transmits only the optical signal pulse having the center frequency of $\omega 2$.

FIGS. 5A–5E are waveform diagrams illustrating the operation of the second embodiment of the present invention. A controlling light pulse is entered simultaneously with one of optical signal pulses. As the refractive index variation of the nonlinear optical waveguide 1 rises at an ultrahigh speed, the center frequency of the optical signal pulse entered simultaneously with the controlling light pulse is shifted to $\omega 2$. The optical signal pulse is divided into two by an optical branching circuit 5. In an arm A, only the optical signal pulse having a center frequency of $\omega 1$ is transmitted through the optical frequency filter 2 and thus guided into an optical signal output port 12. In an arm B, only the optical signal pulse with the center frequency of $\omega 2$ passes through the optical frequency filter 4 and is directed into an optical signal output port 13. In this manner, an all-optical switch operating at a high speed and at a high efficiency can be realized with a simple structure.

An example of the second embodiment of the invention is described. The nonlinear optical waveguide 1 is similar to the example of the first embodiment, and is a buried semiconductor optical waveguide comprising a core of InGaAsP and claddings of InP. The optical frequency filter 2 has a transmission wavelength of 1.550 $\mu$m and a bandwidth of 3.0 nm. The optical frequency filter 4 has a transmission wavelength of 1.545 $\mu$m and a bandwidth of 3.0 nm. The controlling light has a pulse width of 1.5 ps and a wavelength of 1.500 $\mu$m. This wavelength is set within the absorption region of the InGaAsP core. The optical signal has a pulse width of 1 ps, a spectral width of 2.6 nm, and a wavelength of 1.5500 $\mu$m. This wavelength lies within the transparent region of the nonlinear optical waveguide 1. The center frequency of the optical signal pulse entered simultaneously with the controlling light pulse is shifted toward higher frequencies by 0.59 THz. That is, the wavelength is shifted toward shorter wavelengths by 4.7 nm. At this time, the amount of nonlinear phase shift introduced to the optical signal in the nonlinear optical waveguide 1 is $2\pi$. The optical signal pulse is divided into two by an optical branching circuit 5. In an arm A, the optical signal pulse whose center frequency is shifted to 1.5453 $\mu$m is blocked by the optical frequency filter 2. In an arm B, only the optical signal pulse having a center frequency of 1.5500 $\mu$m is blocked by the optical frequency filter 4. In this manner, an optical switch having one input and two outputs is constructed.

Figure 6:
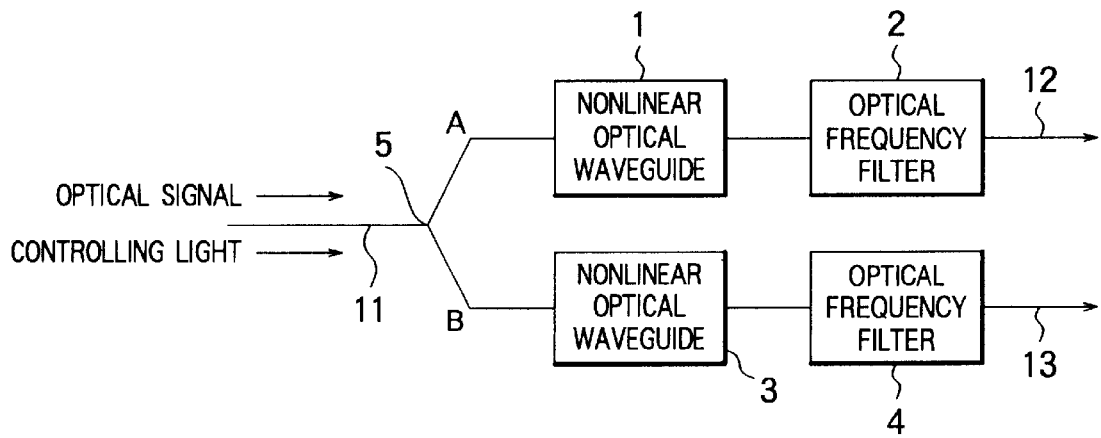
FIG. 6 is a diagram of an optical switch forming a third embodiment of the invention.

FIG. 6 shows the construction of an optical switch having one input and two outputs, the switch forming the third embodiment of the invention. An optical signal pulse having a center frequency of $\omega 1$ and a controlling light pulse having a center frequency of $\omega 0$ are entered through an optical signal/controlling light input port 11, are branched into parts by an optical branching circuit 5, and pass into nonlinear optical waveguides 1 and 3. The optical waveguide portions of the nonlinear optical waveguides 1 and 3 are made of a nonlinear optical medium whose nonlinear refractive index is varied by absorption or amplification of the controlling light. The center frequency ω1 is within the transparent regions of the optical waveguide portions of the nonlinear optical waveguides 1 and 3. Where the center frequency ω0 is set within the absorption regions of the optical waveguide portions of the nonlinear optical waveguides 1 and 3, the controlling light pulse is absorbed, and carriers are excited. This results in a change in the refractive index. The optical waveguide portions of these nonlinear optical waveguides 1 and 3 may be made of a semiconductor gain medium whose refractive index varies when the controlling light is amplified. The optical signals emerging from the nonlinear optical waveguides 1 and 3 pass through optical frequency filters 2 and 4, respectively, and are guided into optical signal output ports 12 and 13, respectively. The optical frequency filter 2 transmits only the optical signal pulse having a center frequency of ω1, while the optical frequency filter 4 transmits only the optical signal pulse having a center frequency of ω2.

FIGS. 7A–7F are waveform diagrams illustrating the operation of the third embodiment of the present invention. A controlling light pulse is entered simultaneously with one of optical signal pulses. As the refractive index variation of the nonlinear optical waveguides 1 and 3 rises at an ultrahigh speed, the center frequency of the optical signal pulse entered simultaneously with the controlling light pulse is shifted to ω2. In an arm A, only the optical signal pulse having a center frequency of ω1 is transmitted through the optical frequency filter 2 and thus guided into an optical signal output port 12. In an arm B, only the optical signal pulse with a center frequency of ω2 passes through the optical frequency filter 4 and is directed into an optical signal output port 13. Thus, an all-optical switch operating at a high speed and at a high efficiency can be accomplished with a simple structure.

An example of the third embodiment of the present invention is next described. The nonlinear optical waveguide 1 is similar to the nonlinear optical waveguide 1 of the example of the first embodiment, and is a buried semiconductor waveguide comprising a core of InGaAsP and a clad of InP. The optical frequency filter 2 has a transmission wavelength of 1.550 μm and a bandwidth of 3.0 nm. The optical frequency filter 4 has a transmission wavelength of 1.545 μm and a bandwidth of 3.0 nm. The controlling light has a pulse width of 1.5 ps and a wavelength of 1.500 μm. This wavelength is set within the absorption region of the InGaAsP core of the nonlinear optical waveguide 1. The optical signal has a pulse width of 1 ps, a spectral width of 2.6 nm, and a wavelength of 1.5500 μm. This wavelength lies within the transparent region of the nonlinear optical waveguide 1. The center frequency of the optical signal pulse entered simultaneously with the controlling light pulse is shifted toward higher frequencies by 0.59 THz. That is, the wavelength is shifted toward shorter wavelengths by 4.7 nm. At this time, the amount of nonlinear phase shift introduced to the optical signal in the nonlinear optical waveguide 1 is 2π. In an arm A, the optical signal pulse whose center frequency is shifted to 1.5453 μm is blocked by the optical frequency filter 2. In another arm B, only the optical signal pulse having a center frequency of 1.5500 μm is blocked by the optical frequency filter 4. In this manner, an optical switch having one input and two outputs is constructed.

FIG. 8 shows the construction of an optical switch having one input and two outputs, the switch forming the fourth embodiment of the invention. An optical signal pulse having a center frequency of ω1 and a controlling light pulse having a center frequency of ω0 are entered through an optical signal/controlling light input port 11 and pass into a nonlinear optical waveguide 1. The optical waveguide portion of the nonlinear optical waveguide 1 is made of a nonlinear optical medium whose nonlinear refractive index is varied by absorption or amplification of the controlling light. The center frequency ω1 is within the transparent region of the optical waveguide portion of the nonlinear optical waveguide 1. Where the center frequency ω0 is set within the absorption region of the optical waveguide portion of the nonlinear optical waveguide 1, the controlling light pulse is absorbed, and carriers are excited. This results in a change in the refractive index. The optical waveguide portion of this nonlinear optical waveguide 1 may also be made of a semiconductor gain medium whose refractive index varies when the controlling light is amplified. The optical signal going out of the nonlinear optical waveguide 1 is diffracted within an array waveguide grating (AWG) 6, and different wavelengths of the optical signal emerge from different output ports.

FIGS. 9A–9E are waveform diagrams illustrating the operation of the fourth embodiment of the present invention. A controlling light pulse is entered simultaneously with one of optical signal pulses. As the refractive index variation of the nonlinear optical waveguide 1 rises at an ultrahigh speed, the center frequency of the optical signal pulse entered simultaneously with the controlling light pulse is shifted to ω2. In the array waveguide grating (AWG) 6, the optical signal pulse having a center frequency of ω1 is delivered from the optical signal output port 12. The optical signal pulse having a center frequency of ω2 is delivered from the optical signal output port 13. Thus, an all-optical switch operating at a high speed and at a high efficiency can be accomplished with a simple structure.

An example of the fourth embodiment of the present invention is next described. The nonlinear optical waveguide 1 is similar to the nonlinear optical waveguide 1 of the example of the first embodiment, and is a buried semiconductor waveguide comprising a core of InGaAsP and claddings of InP. The controlling light has a pulse width of 1.5 ps and a wavelength of 1.500 μm. This wavelength is set within the absorption region of the InGaAsP core of the nonlinear optical waveguide 1. The optical signal has a pulse width of 1 ps, a spectral width of 2.6 nm, and a wavelength of 1.5500 μm. This wavelength lies within the transparent region of the nonlinear optical waveguide 1. The center frequency of the optical signal pulse entered at the same time with the controlling light pulse is shifted toward higher frequencies by 0.59 THz. That is, the wavelength is shifted toward shorter wavelengths by 4.7 nm. At this time, the amount of nonlinear phase shift introduced to the optical signal in the nonlinear optical waveguide 1 is 2π. In the array waveguide grating (AWG) 6, the optical signal pulse of 1.5500 μm is emitted from the optical signal output port 12, whereas the optical signal pulse of 1.5453 μm is produced from the optical signal output port 13. In this manner, an optical switch having one input and two outputs is constructed.

Figure 10:
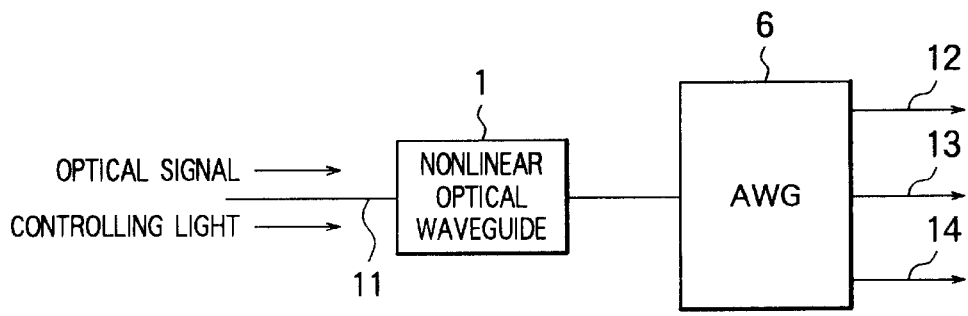
FIG. 10 is a diagram of an optical switch forming a fifth embodiment of the invention.

FIG. 10 shows the construction of an optical switch having one input and three outputs, the switch forming the fifth embodiment of the invention. An optical signal pulse having a center frequency of ω1 and controlling light pulses having center frequencies of ω+ and ω−, respectively, are entered through an optical signal/controlling light input port 11 and pass into the nonlinear optical waveguide 1. The optical waveguide portion of the nonlinear optical waveguide 1 is made of a semiconductor nonlinear optical medium in which an electrical current is injected. The nonlinear refractive index is varied by absorption or amplification of the controlling light pulses. The ω+ and ω− are within the absorption region and within the gain region, respectively, of the nonlinear optical waveguide 1. Where the controlling light pulse having the frequency of ω+ is entered into the nonlinear optical waveguide 1, carriers are excited. This results in a change in the nonlinear refractive index. Where the controlling light pulse having the frequency of ω− is caused to impinge on the nonlinear optical waveguide 1, carriers are reduced, thus producing a change in the nonlinear refractive index. The center frequency ω1 is set within the transparent region of the nonlinear optical waveguide 1. The optical signal going out of the nonlinear optical waveguide 1 is diffracted within the array waveguide grating (AWG) 6, and different wavelengths of the optical signal emerge from different output ports.

FIGS. 11A–11F are waveform diagrams illustrating the operation of the fifth embodiment of the present invention. Where the controlling light pulse having the frequency of ω+ is entered, the center frequency of the optical signal pulse is shifted to ω2 (greater than ω1). Where the controlling light pulse having the frequency of ω− is entered, the center frequency of the optical signal pulses is shifted to ω3 (less than ω1). The optical signal pulse of ω1 exits from an optical signal output port 13. The optical signal pulse of ω2 is emitted from an optical signal output port 12. The optical signal pulse of ω3 emerges from the optical signal output port 14. Thus, an all-optical switch operating at a high speed and at a high efficiency can be accomplished with a simple structure.

An example of the fifth embodiment of the present invention is next described. A nonlinear optical waveguide 1 is similar to the nonlinear optical waveguide 1 of the example of the first embodiment, and is a buried semiconductor waveguide comprising a core of InGaAsP and claddings of InP. An electrical current is injected in the semiconductor optical waveguide, which shows a gain for light having wavelengths of 1.460–1.520 μm. Two wave-lengths of controlling light are used. One wavelength of controlling light has a pulse width of 1.5 ps and a wavelength of 1.450 μm. The other has a pulse width of 1.5 ps and a wavelength of 1.490 μm. The optical signal has a pulse width of 1 ps, a spectral width of 2.6 nm, and a wavelength of 1.5500 μm. This wavelength lies within the transparent region of the nonlinear optical waveguide 1. The center frequency of the optical signal pulse entered simultaneously with the controlling optical pulse of 1.450 μm is shifted toward higher frequencies by 0.59 THz. That is, the wavelength is shifted toward shorter wavelengths by 4.7 nm. The center frequency of the optical signal pulse entered simultaneously with the controlling light of 1.490 μm is shifted toward shorter wavelengths by 0.59 THz. That is, the wavelength is shifted toward longer wavelengths by 4.7 nm. In an AWG 6, the optical signal pulse of 1.5547 μm is delivered from the optical signal output port 12, the optical signal pulse of 1.5500 μm is produced from the optical signal output port 13, and the optical signal pulse of 1.5453 μm exits from the optical signal output port 14. In this manner, an optical switch having one input and three outputs is constructed.

Figure 12:
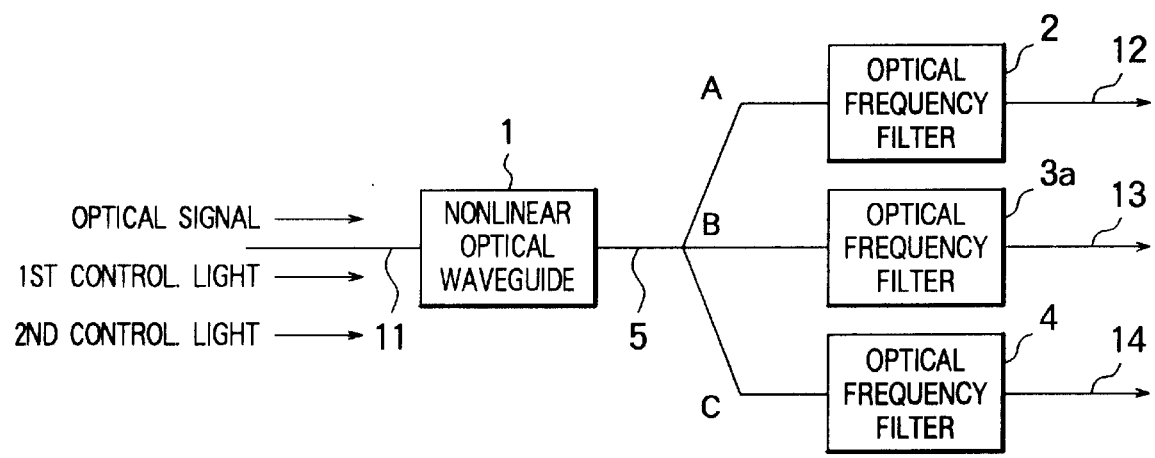
FIG. 12 is a diagram of an optical switch forming a sixth embodiment of the invention.

FIG. 12 shows the construction of an optical switch having 1 input and 3 outputs, the optical switch forming the sixth embodiment of the invention. A nonlinear optical waveguide 1 has an optical signal/controlling light input port 11 to which various signals (i.e., an optical signal pulse having a center frequency of ω1, a first controlling optical pulse having a center frequency of ω0 and a pulse energy of E1, and a second controlling optical pulse having a center frequency of ω0 and a pulse energy of E2) are applied. The ω1 is set within the transparent region of the optical waveguide portion of the nonlinear optical waveguide 1. In this waveguide 1, absorption or amplification of the controlling light induces a change in the nonlinear refractive index, and a nonlinear phase shift is imparted to the optical signal. The optical signal going out of the nonlinear optical waveguide 1 is distributed among arms A, B, and C by an optical branching circuit 5, passed through optical frequency filters 2, 3a, and 4, respectively, and guided into optical signal output ports 12, 13, and 14, respectively. The optical frequency filter 2 transmits only the optical pulse having a center frequency of ω1. The optical frequency filter 3a transmits only the optical pulse having a center frequency of ω2. The optical frequency filter 4 transmits only the optical pulse having a center frequency of ω3.

A change in the nonlinear refractive index of the nonlinear optical waveguide 1 is induced by absorption or amplification of the controlling light. Where this phenomenon is caused by the absorption, the center frequency ω0 of the controlling light is set within the absorption region of the nonlinear optical waveguide 1. In this case, carriers are excited in the waveguide 1, thus varying the refractive index. Where the above-described phenomenon is caused by the amplification, a semiconductor gain medium is used as the nonlinear optical waveguide 1. The center frequency ω0 of the controlling light is set within the amplification region of the nonlinear optical waveguide 1. In this case, the carriers in the waveguide 1 decrease, thus varying the refractive index. In either case, a refractive index variation is caused by a carrier density variation. Therefore, the refractive index variation follows the controlling optical pulse and rises at an ultrahigh speed but falls slowly because of carrier recombination. When the refractive index variation rises at an ultrahigh speed, the phase of the optical signal varies with time and the frequency shifts. Since the relaxation time of the refractive index variation is long, a frequency shift that the optical signal pulse experiences is negligible. Actually, where a controlling light having a pulse width of 2 ps is used, the rising period is on the order of 2 ps. However, the falling period is normally on the order of ns. Therefore, the amount of frequency shift induced by the relaxation of the refractive index is smaller than that obtained during the rising period by two or three orders of magnitude.

FIGS. 13A–13G are waveform diagrams illustrating the operation of the sixth embodiment of the invention. As the refractive index variation of the nonlinear optical waveguide 1 rises at an ultrahigh speed, the optical signal pulse entered concurrently with the first optical pulse of energy E1 is shifted to center frequency ω2. As the refractive index variation of the nonlinear optical waveguide 1 rises at an ultrahigh speed, the optical signal pulse entered simultaneously with the second optical pulse of energy E2 is shifted to center frequency ω3. These optical pulses are divided by the optical branching circuit 5. In an arm A, the signals are passed through the optical frequency filter 2, so that only the optical signal pulse having a center frequency of ω1 is guided into the optical signal output port 12. In another arm B, the signals are passed through the optical frequency filter 3a. As a result, only the optical signal pulse having a center frequency of ω2 is directed to the optical signal output port 13. In a further arm C, the signals are passed through the optical frequency filter 4, so that only the optical signal pulse having a center frequency of ω3 is sent into the optical signal output port 14. Thus, a high-speed and highly efficient optical switch having one input and three outputs can be accomplished with a simple structure. Although the sixth embodiment described in conjunction with FIG. 7A has 1 input and 3 outputs, an optical switch having more optical signal output ports can be realized by using the optical switch in accordance with the invention. That is, optical controlling pulses can be sent to numerous optical signal output ports with a single optical switch by using the optical controlling pulses having different pulse energies in distributing the optical signal pulses to the different optical signal output ports.

An example of the sixth embodiment of the present invention is now described. The nonlinear optical waveguide 1 is a buried semiconductor optical waveguide comprising a core of InGaAsP and a clad of InP. This semiconductor optical waveguide is fabricated by growing InGaAsP on an InP substrate by metallo-organic chemical vapor deposition (MOCVD), patterning the InGaAsP layer into stripes by lithography and wet etching techniques, and growing a layer of InP again by MOCVD to bury InGaAsP. Antireflective coating is applied to both end surfaces of this optical waveguide. The optical waveguide portion made of InGaAsP has an absorption end wavelength of 1.500 μm, a thickness of 0.3 μm, a width of 1 μm, and a length of 300 μm. The optical frequency filter 2 is designed to have a transmission wavelength of 1.5500 μm and a bandwidth of 3.0 nm. The optical frequency filter 3a is designed to have a transmission wavelength of 1.5455 μm and a bandwidth of 3.0 nm. The optical frequency filter 4 is designed to have a transmission wavelength of 1.5410 μm and a bandwidth of 3.0 nm.

The controlling light has a pulse width of 2 ps and a wavelength of 1.5000 μm. This wavelength lies within the absorption region of the InGaAsP core. The dependence of the intensity I of the controlling optical pulse to time t is given by $$I(t) = \text{sech}^2(1.76t/tp)$$

where tp is the half-width value of the pulse. The optical signal has a pulse width of 1 ps, a spectral width of 2.6 nm, and a wavelength of 1.5500 μm. This wavelength is set within the transparent region of the InGaAsP core. The optical signal pulse entered simultaneously with the first controlling optical pulse is shifted toward shorter wavelengths by 4.5 nm. The amount of the nonlinear phase shift introduced to the optical signal in the nonlinear optical waveguide at this time is $3\pi$. The optical signal pulse entered simultaneously with the second controlling optical pulse is shifted toward shorter wavelengths by 9.0 nm. The amount of the nonlinear phase shift introduced to the optical signal in the nonlinear optical waveguide at this time is $6\pi$. These optical pulses are divided by the optical branching circuit 5. In an arm A, the signals are passed through the optical frequency filter 2, so that only the optical signal pulse having a center frequency of 1.5500 μm is guided into the optical signal output port 12. In another arm B, the signals are passed through the optical frequency filter 3a. As a result, only the optical signal pulse shifted to a center frequency of 1.5455 μm is directed to an optical signal output port 13. In a further arm C, the signals are passed through the optical frequency filter 4, so that only the optical signal pulse shifted to a center frequency of 1.5410 μm is sent into an output signal output port 14. Thus, an optical switch having one input and three outputs is obtained.

FIG. 14 shows the construction of an optical switch having one input and three outputs, the switch forming the seventh embodiment of the invention. A nonlinear optical waveguide 1 has an optical signal/controlling light input port 11 to which various signals (i.e., an optical signal pulse having a center frequency of $\omega 1$, a first controlling light pulse having a center frequency of $\omega 0$ and a pulse energy of E1, and a second optical controlling pulse having a center frequency of $\omega 0$ and a pulse energy of E2) are applied. The $\omega 1$ is set within the transparent region of the optical waveguide portion of the nonlinear optical waveguide 1. In this waveguide 1, absorption or amplification of the controlling light induces a change in the nonlinear refractive index, and a nonlinear phase shift is imparted to the optical signal. Where this phenomenon is caused by the absorption, the center frequency $\omega 0$ is set within the absorption region of the optical waveguide portion of the nonlinear optical waveguide 1. Where amplification is utilized for the same purpose, $\omega 0$ is set within the amplification region of the nonlinear optical waveguide 1 consisting of a semiconductor gain medium. The optical signal exiting from the nonlinear optical waveguide 1 is diffracted within an array waveguide grating (AWG) 6, and different wavelengths of the optical signal emerge from different output ports.

FIGS. 15A–15G are waveform diagrams illustrating the operation of the seventh embodiment of the invention. The optical signal pulse entered simultaneously with the first optical controlling pulse is shifted to a center frequency of $\omega 2$. The optical signal pulse entered simultaneously with the second optical controlling pulse is shifted to a center frequency of $\omega 3$. In an AWG 6, an optical signal pulse having a center frequency of $\omega 1$ is emitted from an optical signal output port 12. An optical signal pulse having a center frequency of $\omega 2$ exits from an optical signal output port 13. The optical signal pulse having a center frequency of $\omega 3$ goes out of an optical signal output port 14. Thus, a high-speed and highly efficient optical switch having one input and three outputs can be accomplished with a simple structure. Although the seventh embodiment described in conjunction with FIG. 14 has 1 input and 3 outputs, an optical switch having more optical signal output ports can be realized by using the optical switch in accordance with the invention. That is, optical controlling pulses can be sent to a multiplity of optical signal output ports with a single optical switch by using the optical controlling pulses having different pulse energies in distributing the optical signal pulses to the different optical signal output ports.

An example of the seventh embodiment of the present invention is now described. A nonlinear optical waveguide 1 is a buried semiconductor optical waveguide comprising a core of InGaAsP and a clad of InP in the same way as in the example of the sixth embodiment. The controlling light has a pulse width of 2 ps and a wavelength of 1.500 μm. This wavelength is set within the absorption region of the InGaAsP core of the nonlinear optical waveguide 1. The optical signal has a pulse width of 1 ps, a spectral width of 2.6 nm, and a wavelength of 1.5500 μm. This wavelength lies within the transparent region of the nonlinear optical waveguide 1. The optical signal pulse entered simultaneously with the first controlling optical pulse is shifted toward shorter wavelengths by 4.5 nm. The amount of the nonlinear phase shift introduced to the optical signal in the nonlinear optical waveguide at this time is $3\pi$. The optical signal pulse entered simultaneously with the second controlling optical pulse is shifted toward shorter wavelengths by 9.0 nm. The amount of the nonlinear phase shift introduced to the optical signal in the nonlinear optical waveguide at this time is $6\pi$. In an AWG 6, an optical signal pulse of 1.5500 μm is emitted from an optical signal output port 12. An optical signal pulse of 1.5455 μm exits from an optical signal output port 13. An optical signal pulse of 1.5410 μm goes out of an optical signal output port 14. Thus, an optical switch having one input and three outputs is obtained.

FIG. 16 shows the construction of a gate-type optical switch constituting an eighth embodiment of the invention. A nonlinear optical waveguide 1 has an optical signal/controlling light input port 11 to which various signals (i.e., an optical signal pulse having a center frequency of $\omega 1$ and a controlling light pulse having a center frequency of $\omega 0$) are applied. The $\omega 1$ is set within the transparent region of the optical waveguide portion of the nonlinear optical waveguide 1. In this waveguide 1, absorption or amplification of the controlling light induces a change in the nonlinear refractive index, and a nonlinear phase shift is imparted to the optical signal. Where this phenomenon is caused by the absorption, the center frequency $\omega 0$ is set within the absorption region of the optical waveguide portion of the nonlinear optical waveguide 1. Where amplification is utilized for the same purpose, $\omega 0$ is set within the amplification region of the nonlinear optical waveguide 1 consisting of a semiconductor gain medium. The optical signal exiting from the nonlinear optical waveguide 1 passes through an optical frequency filter 2 and then is guided into an optical signal output port 12. The optical frequency filter 2 is a band-pass filter (BPF) for transmitting only optical pulses having a center frequency of $\omega 2$.

FIGS. 17A–17D are waveform diagrams illustrating the operation of the eighth embodiment of the invention. An optical pulse showing a rectangular waveform plotted with regard to time is used as an optical controlling pulse. A method of generating such an optical rectangular pulse is described, for example, in "Ultrafast Optical Techniques", edited by Tatsuo Yajima, Chapter 5, p. 121, 1990", and is realized by selecting operating conditions appropriate for two effects, i.e., self-phase modulation and normal group velocity dispersion, using fibers or the like. Another method of generating optical rectangular pulses is described in "Journal of Optical Society of America, B, Vol. 5, No. 8, pp. 1563–1572, August, 1988", and consists of extracting an appropriate spectrum through the use of a pair of diffraction gratings and a spatial modulator. The center frequency of the optical signal pulse entered simultaneously with the optical controlling pulse is shifted to $\omega 2$ as the refractive index variation rises at an ultrahigh speed in a nonlinear optical waveguide 1. After passing through the optical frequency filter 2, only the optical signal pulse having a center frequency of $\omega 2$ is guided to an optical signal output port 12. Where a rectangular pulse is used as an optical controlling pulse, a given frequency shift is introduced to the optical signal pulse as long as a controlling pulse is present. Therefore, the resistance to the jitter between the optical controlling pulse and the optical signal pulse is enhanced. Also, the extinction ratio is improved.

An example of the eighth embodiment of the present invention is now described. A nonlinear optical waveguide 1 is a buried semiconductor optical waveguide comprising a core of InGaAsP and a clad of InP, in the same way as in the example of the sixth embodiment. The controlling light is a rectangular pulse having a pulse width of 3 ps and a wavelength of 1.500 μm. This wavelength is set within the absorption region of InGaAsP forming the core of the waveguide 1. The optical signal pulse has a pulse width of 1 ps, a spectral width of 2.6 nm, and a wavelength of 1.5500 μm. This wavelength lies within the transparent region of the waveguide 1. The optical frequency filter 2 has a transmission wavelength of 1.5470 μm and a bandwidth of 3.0 nm.

The optical signal pulse entered simultaneously with the optical controlling pulse is shifted toward shorter wavelengths by 3 nm. The amount of nonlinear phase shift introduced to the optical signal in the nonlinear optical waveguide 1 is $2\pi$. Since the signals are passed through the optical filter 2, only the optical signal pulse shifted to a wavelength of 1.5470 μm is delivered from the optical signal output port 12. In the present example, it has been observed that, if the jitter between the optical controlling pulse and the optical signal pulse is 2 ps, the output from the output port 12 suffers from almost no extinction ratio deterioration.

FIG. 18 shows the construction of a gate-type optical switch forming a ninth embodiment of the invention. A nonlinear optical waveguide 1 has an optical signal/controlling light input port 11 to which both an optical signal pulse having a center frequency of $\omega 1$ and an optical controlling pulse having a center frequency of $\omega 0$ are applied. The $\omega 1$ is set within the transparent region of the optical waveguide portion of the nonlinear optical waveguide 1. In this waveguide 1, absorption or amplification of the controlling light induces a change in the nonlinear refractive index, and a nonlinear phase shift is imparted to the optical signal. Where this phenomenon is caused by the absorption, the center frequency $\omega 0$ is set within the absorption region of the optical waveguide portion of the nonlinear optical waveguide 1. Where amplification is utilized for the same purpose, $\omega 0$ is set within the amplification region of the nonlinear optical waveguide 1 consisting of a semiconductor gain medium. The optical signal exiting from the nonlinear optical waveguide 1 passes through an optical frequency filter 2 and then is guided into an optical signal output port 12.

FIGS. 19A–19E are waveform diagrams illustrating the operation of the ninth embodiment of the invention. As the refractive index variation rises at an ultrahigh speed in the nonlinear optical waveguide 1, the center frequency of the optical signal pulse entered simultaneously with the optical controlling pulse is shifted to $\omega 2$.

Figure 20:
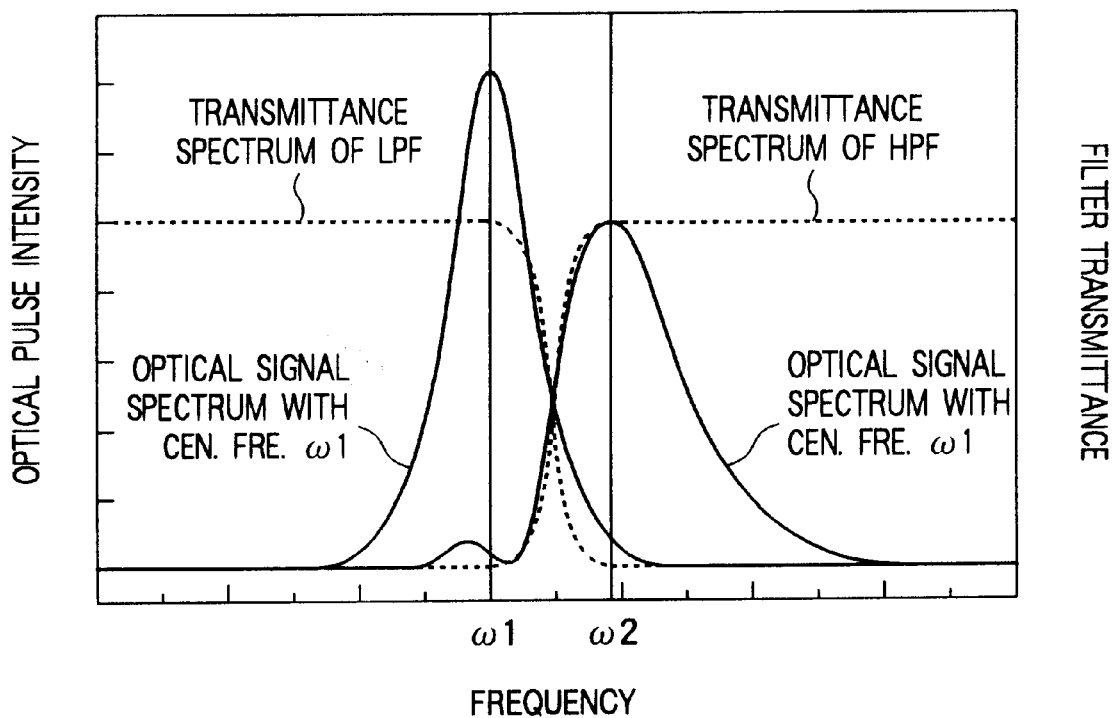
FIG. 20 is a spectrum of optical signal pulses exiting from the nonlinear optical waveguide of the optical switch shown in FIG. 18.

FIG. 20 shows a spectrum of an optical signal pulse exiting from a nonlinear optical waveguide 1. Where a refractive index variation owing to absorption of controlling light is used, the center frequency $\omega 2$ is greater than $\omega 1$. A high-pass filter (HPF) or low-pass filter (LPF) having a transmission characteristic as shown in FIG. 20 is used as an optical frequency filter 2. In the case of the high-pass filter, the transmittance at $(\omega 1+\omega 2)/2$ is half of the maximum transmittance. The maximum transmittance is shown where $\omega$ is greater than $\omega 2$. In the case of the low-pass filter, the transmittance at $(\omega 1+\omega 2)/2$ is half of the maximum transmittance. The maximum transmittance is shown where $\omega$ is less than $\omega 1$. Preferably, the gradient of the transmittance variation is made as steep as possible. Where a high-pass filter is employed, only the optical signal pulse of $\omega 2$ is delivered. Where a low-pass filter is used, only the optical signal pulse of $\omega 1$ is produced. Where a high-pass filter is used, the optical signal pulse passing through the filter is wider than where a band-pass filter having a center frequency of $\omega 2$ is used. Furthermore, loss of the optical signal is suppressed greatly. Similarly, where a low-pass filter is used, the optical signal pulse passing through the filter is wider than where a band-pass filter having a center frequency of $\omega 1$ is used. Also, loss of the optical signal is suppressed greatly.

An example of the ninth embodiment of the present invention is now described. A nonlinear optical waveguide 1 is a buried semiconductor optical waveguide comprising a core of InGaAsP and a clad of InP, in the same way as in the example of the sixth embodiment. The controlling light has a pulse width of 1.5 ps and a wavelength of 1.500 μm. This wavelength is set within the absorption region of InGaAsP forming the core of the waveguide 1. The optical signal pulse has a pulse width of 1 ps, a spectral width of 2.6 nm, and a wavelength of 1.5500 μm. This wavelength lies within the transparent region of the waveguide 1. Either a high-pass filter showing a transmittance half of the maximum transmittance at 1.5485 μm and exhibiting a maximum transmittance at wavelengths shorter than 1.5470 μm, or a low-pass filter showing a transmittance half of the maximum transmittance at 1.5485 μm and exhibiting a maximum transmittance at wavelengths longer than 1.5500 μm, is used as the optical frequency filter 2.

The optical signal pulse entered simultaneously with the optical controlling pulse is shifted toward shorter wavelengths by 3 nm. The amount of nonlinear phase shift introduced to the optical signal in the nonlinear optical waveguide 1 is 2π. Where a high-pass filter (HPF) is used as the optical frequency filter 2, only the optical signal pulse shifted to a wavelength of 1.5470 μm exits from the optical signal output port 12. Where a low-pass filter (LPF) is used as the optical frequency filter 2, only the optical signal pulse having a wavelength of 1.5500 μm is emitted from the optical signal output port 12.

FIG. 21 shows the construction of a gate-type optical switch forming a tenth embodiment of the invention. A nonlinear optical waveguide 1 has an optical signal/controlling light input port 11 to which both an optical signal pulse having a center frequency of ω1 and an optical controlling pulse having a center frequency of ω0 are applied. The ω1 is set within the transparent region of the optical waveguide portion of the nonlinear optical waveguide 1. The ω0 is set within the absorption region of the waveguide 1. In this optical waveguide 1, absorption of the controlling light induces a change in the nonlinear refractive index, imparting a nonlinear phase shift to the optical signal. The optical signal going out of the nonlinear optical waveguide 1 passes through an optical frequency filter 2, is amplified by a semiconductor optical amplifier 7, and is guided into an optical signal output port 12.

FIGS. 22A–22D are waveform diagrams illustrating the operation of the tenth embodiment of the invention. As the refractive index variation of the nonlinear optical waveguide 1 rises at an ultrahigh speed, the center frequency of the optical signal pulse entered simultaneously with the optical controlling pulse is shifted to ω2.

Figure 23A:
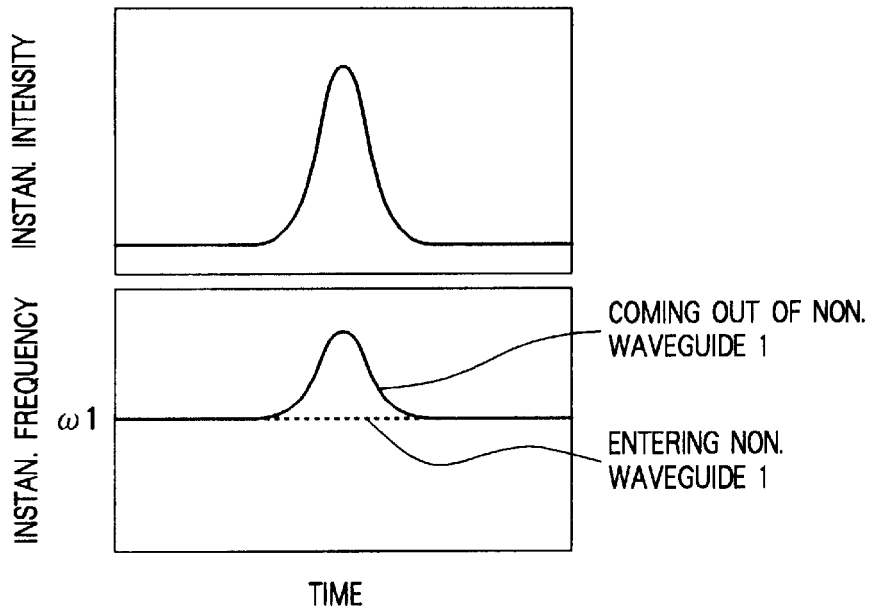
FIG. 23A is a waveform diagram illustrating the time-dependence of the instantaneous intensity and instantaneous frequency of an optical signal exiting from the nonlinear optical waveguide of the optical switch shown in FIG. 21, the optical signal being entered simultaneously with controlling light.

FIG. 23A shows the dependence of the instantaneous intensity and the instantaneous frequency on time when the optical signal pulse entered simultaneously with the controlling light exits from the nonlinear optical waveguide 1. The instantaneous frequency shows variations in the frequency with time, the variation being caused by variations in the nonlinear optical refractive index produced by the optical controlling pulse. The graph indicates that the highest frequency is produced near the peak of the instantaneous intensity. The dependence of this instantaneous frequency on time is derived from the following considerations. Suppose that the optical controlling pulse has an instantaneous intensity represented by a waveform that is in proportion to G (t) and varies with time. The phase shift ϕ (t) introduced to the optical signal is generally expressed by a rate equation given by $$d\phi(t)/dt = G(t) - \phi(t)/\tau$$

where τ is a relaxation time. Since it is assumed that a time domain sufficiently shorter than the τ is treated here, the second term of the above equation can be neglected. Because the instantaneous frequency shift delta ω (t) accompanying a nonlinear refractive index variation is expressed by a time differential of the phase shift ϕ (t) introduced to the optical signal, the dependence of the instantaneous frequency of the optical signal on time is given by $$\omega(t) = \omega 1 + \Delta\omega(t)$$
$$\omega 1 + G(t)$$

Figure 23B:
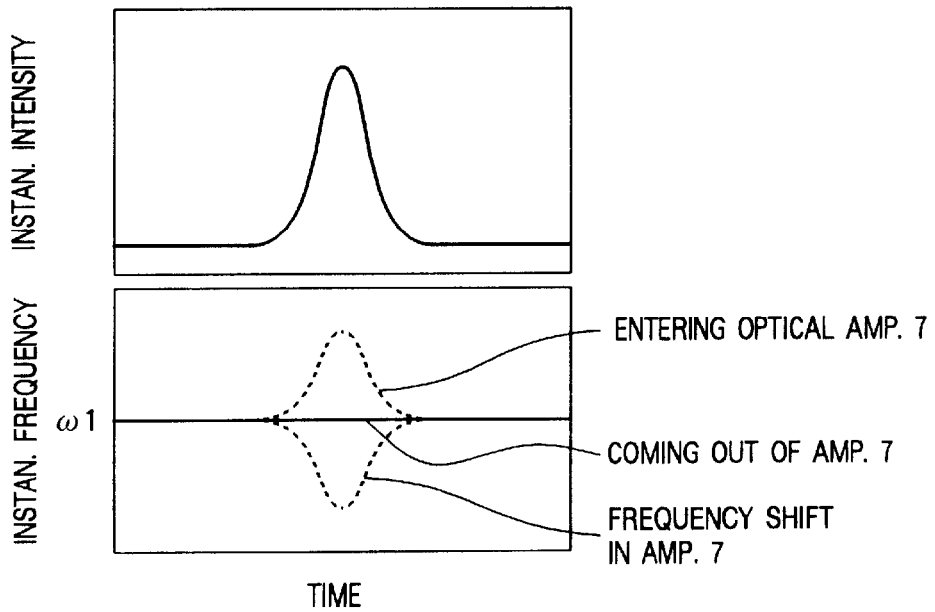
FIG. 23B is a waveform diagram illustrating the time-dependence of the instantaneous intensity and instantaneous frequency of an optical signal exiting from a semiconductor amplifier of the optical switch shown in FIG. 21.

FIG. 23B illustrates the dependence of the instantaneous intensity and instantaneous frequency of the optical signal pulse on time when the pulse having the characteristic shown in FIG. 23A exits from a semiconductor optical amplifier 7. When the optical signal pulse is amplified by the optical amplifier 7, carriers are decreased, thus varying the nonlinear refractive index. Therefore, the instantaneous frequency of the optical signal pulse also changes. However, the lowest frequency appears near the peak of the instantaneous intensity, opposite to variations in the instantaneous frequency occurring in the nonlinear optical waveguide 1. Accordingly, with respect to the optical signal pulse going out of the semiconductor optical amplifier 7, the instantaneous frequency does not change with time. When optical signal pulses of this kind are transmitted over fibers, the pulses are less affected by pulse waveform deterioration caused by group velocity dispersion in the fibers. Furthermore, the novel optical switch compensates for loss of the optical signal pulses produced by passage through the nonlinear optical waveguide 1 and through the optical frequency filter 2.

An example of the tenth embodiment of the present invention is now described. The nonlinear optical waveguide 1 is a buried semiconductor optical waveguide comprising a core of InGaAsP and a clad of InP, in the same way as in the example of the sixth embodiment. The controlling light has a pulse width of 1.5 ps and a wavelength of 1.500 μm. This wavelength is set within the absorption region of InGaAsP forming the core of the waveguide 1. The optical signal pulse has a pulse width of 1 ps, a spectral width of 2.6 nm, and a wavelength of 1.5500 μm. This wavelength lies within the transparent region of the waveguide 1. The optical frequency filter 2 is designed to have a transmittance wavelength of 1.5470 μm and a bandwidth of 3.0 nm. The semiconductor amplifier 7 is a buried semiconductor waveguide comprising a core of InGaAsP and a clad of InP. The absorption end lies near a wavelength of 1.7 μm. A bias current is fed to this semiconductor optical amplifier 7, which shows a gain for an optical signal of 1.5470 μm.

The optical signal pulse entered simultaneously with the optical controlling pulse is shifted toward shorter wavelengths by 3 nm. The amount of nonlinear phase shift introduced to the optical signal in the nonlinear optical waveguide 1 is 2π. Because of passage through the optical frequency filter 2, only the optical signal pulse shifted to a wavelength of 1.5470 μm is allowed to impinge on the semiconductor optical amplifier 7. An optical signal pulse having a wavelength of 1.5500 μm and having an instantaneous frequency kept constant irrespective of an elapse of time is delivered from the optical signal output port 12.

In the above description, optical switches each using a nonlinear optical waveguide comprising a core of InGaAsP and a clad of InP are given as examples. In the present invention, a multi-quantum well structure of InGaAs/InGaAsP that can be formed on an InP substrate is used as a core. Alternatively, a material that can be deposited on a GaAs substrate may be employed. Where a nonlinear optical waveguide made of these and other materials is used, a similar optical switch is obtained. Also, in some embodiments, optical switches are constructed by a set of discrete optical components, that is, a nonlinear optical waveguide is combined with a single optical filter or with an array waveguide grating (AWG). Where an optical switch is constructed, by other sets of optical components, such as a monolithic optical circuit fabricated on a semiconductor substrate in accordance with the present invention, similar advantages are produced. The wavelength of the optical signal is not limited to the transparent region of the nonlinear optical waveguide. Where a nonlinear optical waveguide capable of amplifying light is used, similar advantages can be obtained if the wavelength of the optical signal is set within the gain region. Thus, a high-speed, highly efficient optical switch can be accomplished with a simple structure in accordance with the invention. In addition, the novel optical switch can have an increased number of optical signal output ports, improved resistance to jitter, and a less limited bandwidth and produce optical signal output pulses that can be transmitted over fibers with improved characteristics.

What is claimed is:

1. An optical switch comprising:
   input means for entering an optical signal and a controlling light into an optical waveguide;
   said optical waveguide consisting of a nonlinear optical medium having a nonlinear refractive index change that is varied by absorption or amplification of said controlling light, wherein said variation of said nonlinear refractive index change causes a change in a frequency of only a part of said optical signal that is temporally coincident with said controlling light, said optical waveguide outputting said changed optical signal; and
   an optical frequency bandpass filter for receiving said changed optical signal and transmitting only one of said part of said optical signal that experiences a frequency change and the residual part of said optical signal that does not experience a frequency change.

2. An optical switch as claimed in claim 1, wherein said controlling light consists of pulses having a waveform approximating a rectangular form.

3. An optical switch as claimed in claim 1, wherein said optical frequency filter has a transmittance depending on optical frequencies and acts as a high- or low-pass filter.

4. An optical switch as claimed in claim 1, further comprising a semiconductor optical amplifier connected after said optical frequency filter.

5. An optical switch comprising:
   input means for entering an optical signal and a controlling light into an optical waveguide;
   said optical waveguide consisting of a nonlinear optical medium having a nonlinear refractive index change that is varied by absorption or amplification of said controlling light, wherein said variation of said nonlinear refractive index change causes a change in a frequency of only a part of said optical signal that is temporally coincident with said controlling light, said optical waveguide outputting said changed optical signal;
   an optical branching circuit for dividing said changed optical signal into plural parts; and
   an optical frequency bandpass filter for each of said plural parts, each optical frequency bandpass filter receiving one of said plural parts and transmitting only one of said part of said optical signal that experiences a frequency change and the residual part of said optical signal that does not experience a frequency change.

6. An optical switch as claimed in claim 5, wherein said controlling light consists of pulses having energies set to different values.

7. An optical switch as claimed in claim 5, wherein said controlling light has a first wavelength which is absorbed in said optical waveguide and a second wavelength which is amplified by said optical waveguide.

8. An optical switch as claimed in claim 5, wherein said controlling light consists of pulses having a waveform approximating a rectangular form.

9. An optical switch as claimed in claim 5, wherein said optical frequency filter has a transmittance depending on optical frequencies and acts as a high-pass or low-pass filter.

10. An optical switch as claimed in claim 5, further comprising a semiconductor optical amplifier connected after said optical frequency filter.

11. An optical switch comprising:
    input means for entering an optical signal and a controlling light into an optical branching circuit;
    said optical branching circuit for dividing each of said optical signal and said controlling light into plural parts;
    a plurality of optical waveguides, each optical waveguide consisting of a nonlinear optical medium having a nonlinear refractive index change that is varied by absorption or amplification of said controlling light, said each optical waveguide receiving one of said plural parts of said optical signal and one of said plural parts of said controlling light exiting from said optical branching circuit, wherein said variation of said nonlinear refractive index change causes a change in a frequency of only a part of each one of said plural parts of said optical signal that is temporally coincident with one of said plural parts of said controlling light, said plurality of optical waveguides each outputting the corresponding said changed one of said plural parts of said optical signal; and
    an optical frequency bandpass filter for each of said plural parts, each optical frequency bandpass filter transmitting a corresponding one of said part of said optical signal that experiences a frequency change and the residual part of said optical signal that does not experience a frequency change.

12. An optical switch as claimed in claim 11, wherein said controlling light consists of pulses having a waveform approximating a rectangular form.

13. An optical switch as claimed in claim 11, wherein said optical frequency filter has a transmittance depending on optical frequencies and acts as a high-pass or low-pass filter.

14. An optical switch as claimed in claim 11, further comprising a semiconductor optical amplifier connected after said optical frequency filter.

15. An optical switch comprising:
    input means for entering an optical signal and a controlling light into an optical waveguide;

said optical waveguide consisting of a nonlinear optical medium having a nonlinear refractive index change that is varied by absorption or amplification of said controlling light, wherein said variation of said nonlinear refractive index change causes a change in a frequency of only a part of said optical signal that is temporally coincident with said controlling light, said optical waveguide outputting said changed optical signal; and means for diffracting said changed optical signal exiting from said optical waveguide to different output ports according to the different optical frequencies of said changed optical signal.

16. An optical switch as claimed in claim 15, wherein said controlling light consists of pulses having energies set to different values.

17. An optical switch as claimed in claim 15, wherein said controlling light has a first wavelength which is absorbed in said optical waveguide and a second wavelength which is amplified by said optical waveguide.

18. An optical switch as claimed in claim 15, wherein said controlling light consists of pulses having a waveform approximating a rectangular form.

19. An optical switch as claimed in claim 15, further comprising a semiconductor optical amplifier connected after said optical frequency filter.

* * * * *